Sept. 17, 1968 R. W. CRONQUIST 3,401,971
INTRENCHING TOOL
Filed Feb. 21, 1967 5 Sheets-Sheet 1
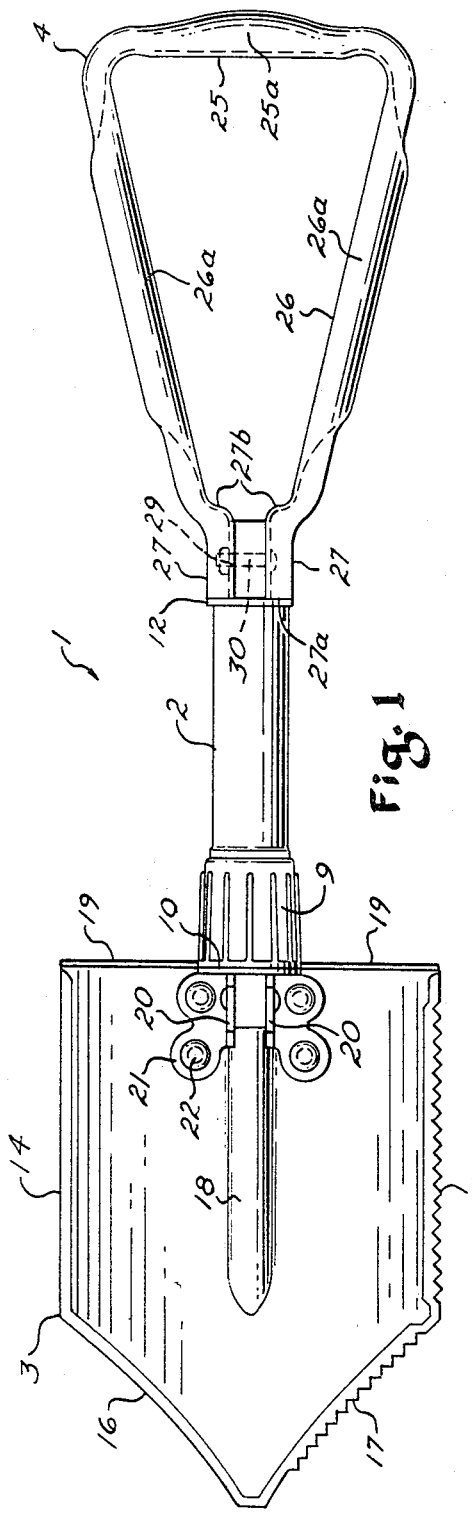
INVENTOR.
Robert W. Cronquist
BY
J. H. SLOUGH
ATTORNEY

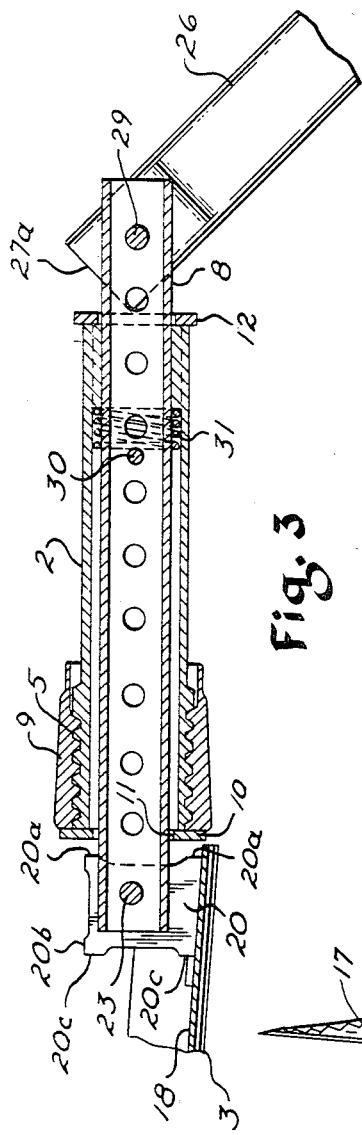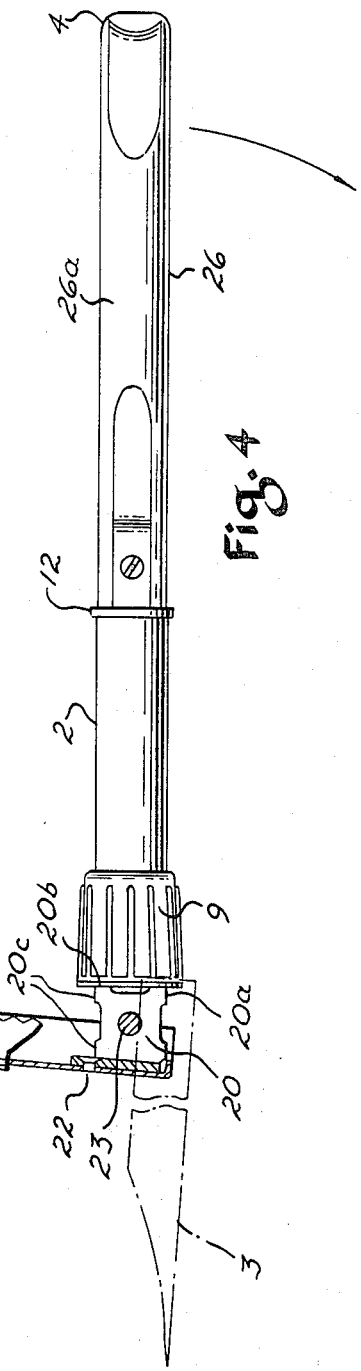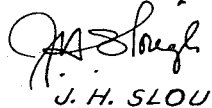

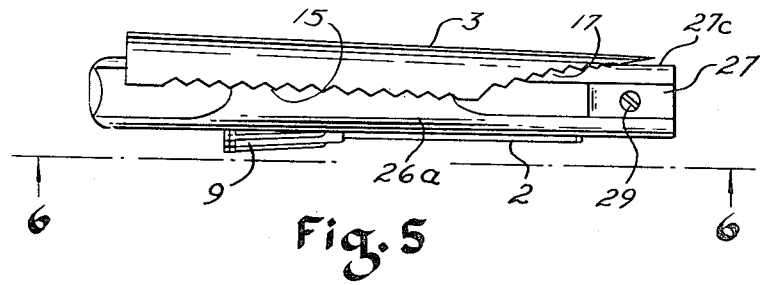
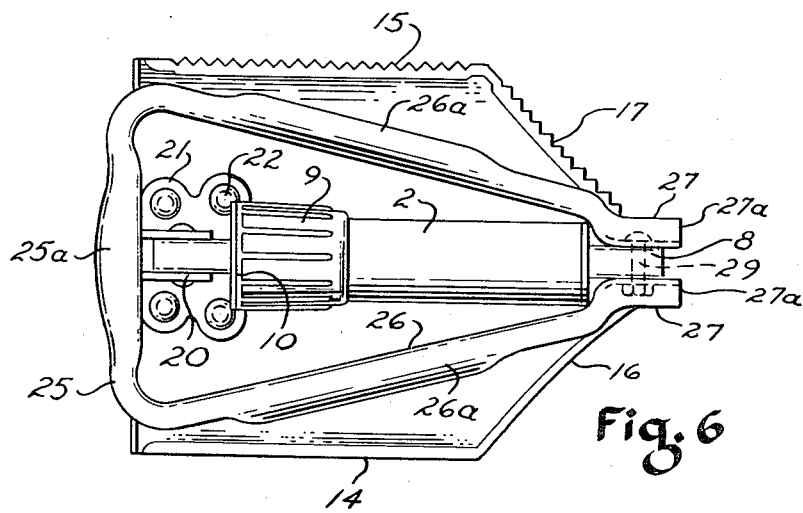
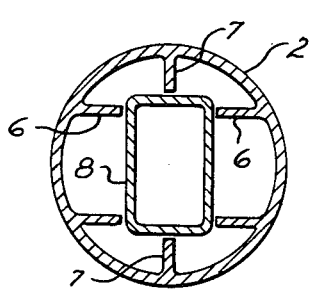 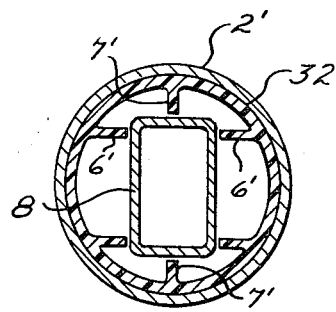

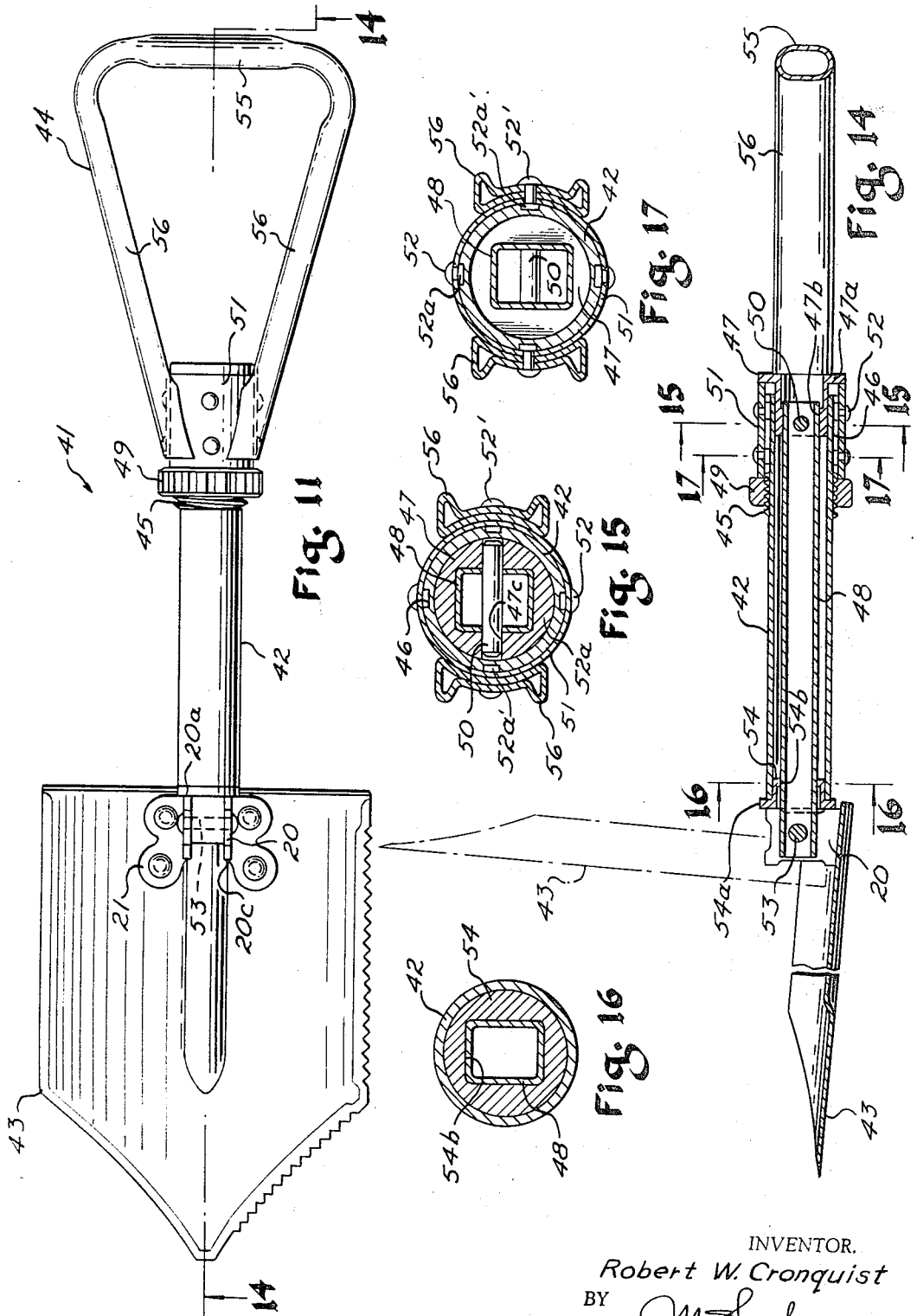

Sept. 17, 1968 R. W. CRONQUIST 3,401,971
INTRENCHING TOOL
Filed Feb. 21, 1967 5 Sheets-Sheet 5

INVENTOR.
Robert W. Cronquist
BY
J. H. SLOUGH
ATTORNEY

United States Patent Office 3,401,971
Patented Sept. 17, 1968

3,401,971
INTRENCHING TOOL
Robert W. Cronquist, Ashtabula, Ohio, assignor, by mesne assignments, to True Temper Corporation, Cleveland, Ohio, a corporation of Delaware
Filed Feb. 21, 1967, Ser. No. 610,835
25 Claims. (Cl. 294—53.5)

ABSTRACT OF THE DISCLOSURE

The following description and accompanying drawings disclose an entrenching tool having a blade, a handle, and a grip portion. In one embodiment of the invention, the grip portion is foldable over the handle and in another embodiment, the handle telescopes within the grip portion. In both embodiments, the blade is foldable over both the handle and the grip portion, and a single adjustment means is provided for locking both the blade and grip portion in work operating position.

---

This invention relates to hand tools and more particularly to a hand tool having a collapsible handle and work portion whereby the same may be adjusted to a compact position when not in use.

An important object of this invention is to provide a hand tool which can be easily and quickly folded and/or telescoped into a relatively small, compact condition when not in use.

Another object of the invention is to provide a tool of the type set forth above which is readily adaptable for carrying on the person or in limited space in its compact condition.

Yet another object of this invention is to provide a tool as set forth above which is so constructed that a rapid change from one type of tool to another may be readily accomplished.

A still further object of this invention is to provide a tool having the characteristics and features set forth above and including means for acting simultaneously on both the handle and the work portion thereof, whereby the tool may be readily adjusted to and locked in any operative position.

Still another object of this invention is to provide a tool of the type set forth above having a spade-like blade for a work portion whereby said tool is adapted for use as an intrenching tool for military personnel.

Another object of this invention is to provide an intrenching tool of the type related in the preceding paragraph, which tool is adapted as a combination tool, being adapted for use in different operative positions and in different operative manner.

A further object of this invention is to provide a hand tool of the type described which is simple and sturdy in construction, light in weight, economical to manufacture and highly efficient and durable in use.

Other objects of this invention and the invention itself will become more readily apparent from the following description and accompanying drawings, in which said drawings:

FIGURE 1 is a plan view of a first modification of the present invention;

FIGURT 2 is a longitudinal section of the modification of the invention of FIGURE 1;

FIGURE 3 is an enlarged fragmentary view similar to FIGURE 2 showing an intermediate position of a foldable handle of the tool according to the first modification thereof;

FIGURE 4 is a side elevation of the modification of FIGURE 1 showing the blade in solid line in one operative position and, in dot-dash line, a second operative position;

FIGURE 5 is a side elevation of the modification of FIGURES 1 to 4 inclusive, showing the tool of the present invention in its completely folded position;

FIGURE 6 is a bottom plan view taken from the line 6—6 of FIGURE 5;

FIGURE 7 is an enlarged transverse section taken along the line 7—7 of FIGURE 2;

FIGURE 8 is a view similar to the view of FIGURE 7 showing a modified structure in one part of the tool;

FIGURE 9 is an enlarged transverse section taken along the line 9—9 of FIGURE 2;

FIGURE 10 is a transverse section taken on the line 10—10 of FIGURE 2;

FIGURE 11 is a plan view of a second modification of the present invention;

FIGURE 14 is a longitudinal section taken along the line 14—14 of FIGURE 11 and, in dot-dash lines, shows the blade in a second operative position;

FIGURE 15 is a transverse section taken along the line 15—15 of FIGURE 14;

FIGURE 16 is a transverse section taken along the line 16—16 of FIGURE 14;

FIGURE 17 is a transverse section taken along the line 17—17 of FIGURE 14.

Figure 12:
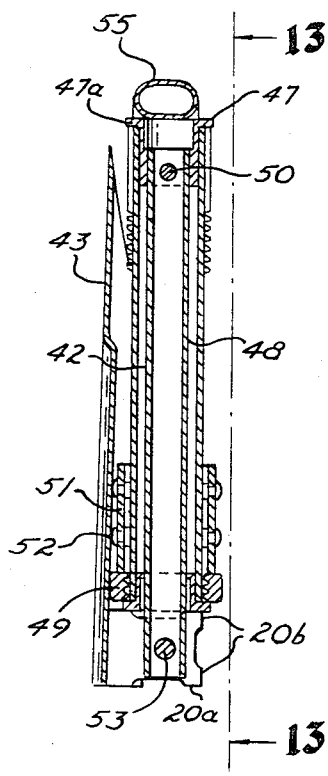
FIGURE 12 is a longitudinal section showing the modification of FIGURE 11 in folded position.

Referring now to the drawings, in all of which like parts are designated by like reference characters, the hand tool of this invention is herein illustrated and described as an intrenching tool having a digging and cutting blade and being particularly adapted to military use. However, it will be readily understood that the blade or work portion, the handle, the angles of blade to handle, etc., of the invention could be varied to suit different purposes.

The first embodiment or modification of the invention is disclosed in FIGURES 1-10 of the drawings and comprises an intrenching tool generally indicated at 1 having a central handle 2 carrying a spade-like blade 3 at one end of an elongated grip portion 4 at the other end, which grip as illustrated in this form of the invention is a divided handle enclosing grip and provided with lateral gripping surfaces 26a as well as end gripping surface 25a. The handle 2 is tubular in form and preferably metallic although other suitable materials, such as, Bakelite, plastic, fiber glass, etc., might be employed. Said handle has an externally threaded portion 5 at the end thereof adjacent to the blade 3 (FIGURES 2 and 3) and is provided internally with inwardly directed guide fins 6 and 7 adjacent to the opposite end thereof (FIGURE 7). The guide fins 6 are horizontally disposed as illustrated in FIGURE 7, are arranged in pairs vertically spaced from each other and project inwardly from either side of the tubular handle 2. The guide fins 7 project vertically upwardly and downwardly within said handle, and the inner edges of all of said fins provide means for slidable positioning and guiding stress tension means 8 disposed within the handle portion 2 which provides the connection means for the blade 3 and grip 4. The said tension means 8 as shown is preferably tubular in form and preferably lightened by the removal of material therefrom, as by providing apertures 8' therein, or by the provision of slots, etc.

The externally threaded portion 5 of the handle 2 carries an internally threaded adjustment nut 9 thereon and the forward end of said nut carries thrust means 10 having a circular opening 11, as best seen in FIGURE 3. The thrust means shown is a washer 10 secured to the forward end of the adjustment nut 9 adjacent to the blade 3 in any suitable manner, such as by riveting, welding, or the like, and said washer is telescoped over and rotatable with respect to the tension means 8. The tension means 8 extends longitudinally outwardly beyond the thrust washer 10 in what will hereinafter be referred to as a forward direction and outwardly substantially beyond the opposite end of said handle in what will hereinafter be referred to as a rearward direction. A second thrust means 12 in the form of a washer is disposed flatwise against the rearwardly directed end of the tubular handle 2, said thrust washer 12 being as shown generally rectangular in shape and having a rectangular central opening 13 for slidably and non-rotatably receiving the tension tube 8 (FIGURE 9).

The blade 3, as seen in FIGURE 1, is generally spade-shape as herein disclosed having generally straight parallel side edges 14 and 15 and transversely curved, forwardly converging edge portions 16 and 17 at the forwardly directed end thereof. The side edge 14 and the edge portion 16 are preferably sharpened and serve as knife-like cutting edges and the side edge 15 and the edge portion 17, as herein shown, are preferably serrated and sharpened or provided with a sawtooth edge for purposes of sawing, chopping, and cutting underbrush, weeds, etc. It will be further noted that the converging edge portions 16 and 17 are curved inwardly a slight amount as seen in plan view (FIGURE 1) to provide edge cutting portions similar to that of a scythe blade. The blade 3 is preferably arcuate in cross-section and has a centrally disposed, longitudinally directed, upwardly protruding reinforcing rib 18 which extends forwardly from the rearmost edge of said blade substantially the distance of the parallel side edges 14 and 15. The rearmost edge of the blade 3 is preferably turned outwardly as shown in FIGURE 1 to provide steps 19 on either side of the tubular handle 2 which act as reinforcement means as well as boot protectors.

The blade 3 is connected to the tension tube 8 by means of a pair of laterally spaced hinged brackets 20 having laterally directed bases 21 angled with respect to the brackets 20 and secured to said blade by rivets 22. The tension tube 8 projects between the hinged brackets 20 and is pivoted thereto by a pin 23. Referring now particularly to FIGURE 2 of the drawings, it will be noted that the hinged brackets 20 shown in side elevation are provided with adjustable bearing surfaces, and as shown consist of three preferably generally flat, exposed edge surface portions 20a, 20b, 20c (FIGURES 2 and 3). With the blade in the forwardly projecting or digging position of FIGURE 2, the edge surface portions 20a are disposed edgewise against the flat forward surface of the thrust washer 10. As best shown in FIGURE 4, the blade 3 is rotatable to a generally upright position at which time the edge surface portions 20b are disposed flatwise against said thrust washer 10. Further, the blade 3 can be folded flatwise over the handle 2 to the position shown in FIGURE 5 at which time the edge surface portions 20c would be disposed edgewise against said thrust washer. As will hereinafter become clear, the blade 3 may be locked in any one of the positions described.

The grip portion 4 as illustrated in this form comprises a transverse grip 25 and integral, converging arms 26 having grip portions 26a as above noted and short, parallel end portions 27 adapted to be disposed on either side of the rearwardly directed end portion of the tension tube 8 and compressively engaged therewith, being pivotally mounted thereon in any suitable manner, such as, by means of a bolt and nut assembly 29.

Referring again to FIGURE 2 of the drawings, and additionally to the sectional detail of FIGURE 10, the tension tube 8 carries a transverse pin 30, the ends of which terminate just short of the inner walls of the hollow, tubular handle 2. The pin 30 is disposed a short distance forwardly of the guide fins 6 and 7, and a coil spring 31 is compressively disposed between said pin and said fin acting as a shoulder bottoming said spring. This causes the tension tube 8 to be constantly under spring pressure whereby the same is urged forwardly or toward the left as viewed in FIGURE 2 thereby tending to keep the grip portion 4 against the thrust washer 10 and urging the blade 3 in a forward direction. It will be noted that the spring pressure is preferably sufficient to exert a spring pressure upon the thrust washer 12 and against the end portions 27 of the grip to hold the grip in secure alignment with the handle 2 during adjustment of the blade 3. It will further be noted at this point that in FIGURE 8 there is shown an alternate means of providing the inwardly directed guide means, said alternate means comprising a cylinder, preferably plastic insert sleeve 32, adapted to fit snugly within a modified tubular handle 2' having a smooth inner bore throughout its axial length. The insert sleeve 32, would, in turn, be provided with integral guide fins 6' and 7' identical in position and function with the guide fins 6 and 7, respectively.

In manipulating the intrenching tool of the first embodiment of the invention, the adjustment nut 9 is rotated to move rearwardly from the position shown in FIGURE 2 to the position shown in FIGURE 3. This moves the thrust washer 10 rearwardly away from the hinged brackets 20 of the blade 3. In this position, there is sufficient clearance in front of the thrust washer 10 to allow the blade 3 to be rotated about its pivot 23 from the position in FIGURE 2 to either the position in FIGURE 4 or that shown in FIGURE 5. There is also sufficient clearance between the thrust washer 12 and the mounting portion 27 of the grip to allow the grip portion 4 to be rotated and folded upwardly over the handle 2, whereby said handle is disposed between the arms 26 but the spring 31 is operative to hold the grip and handle in end-to-end aligned secure position during pivotal movement of the blade. As particularly shown in FIGURE 3, the parallel mounting portions 27 of the grip portion 4 are provided with flat abutting end portions 27a which, in the position of FIGURE 2, are disposed edgewise against the thrust washer 12. The parallel portions 27 as shown are generally rectangular inside elevation, and the clearance provided at the forward end of the handle 2 by retracting the adjustment nut 9 allows relative movement of the tension tube 8 and the handle 2 rearwardly and then forwardly again as said grip portion is rotated with the corners of the paralell portions 27 passing over the rearwardly directed surface of the thrust washer 12 and one of side surface portions 27c coming into flatwise engagement with said thrust washer. Rotation of the grip portion 4 a full 180° brings the rearwardly directed ends of the parallel portions 27, as shown at 27b in FIGURE 1, against the thrust washer 12 and such rotation in a downward direction as indicated by the arrow in FIGURE 4 enables the folding of such grip under the top surface of the now inverted blade.

When the blade 3 and the grip portion 4 have been rotated to the desired position, the adjustment nut 9 is turned to move forwardly beyond the forward end of the handle 2 thereby firmly seating the thrust washer 10 against an associated one of the edge portions 20a, 20b or 20c of the hinged bracket 20 while at the same time firmly seating the thrust washer 12 against either the surfaces 27a or 27b of the parallel mounting portions 27 of the grip portion 4 and in such position the handle and grip are both locked against movement.

FIGURES 11–17 illustrate a second modification of the invention, said modification comprising an intrenching tool generally indicated at 41. Said tool comprises a central handle portion 42 having a spade-like blade 43 disposed at its forward end and a modified grip portion 44 disposed at the opposite end thereof.

The handle 24 as shown is tubular in form and is provided with an externally threaded portion 45 spaced forwardly a short distance from the rearwardly directed end of said handle. The tubular wall of the handle 42 is substantially thickened from the externally threaded portion 45 rearwardly of the end of said handle, or pivoted to the sleeve (not shown) and longitudinal grooves 46 are provided at the top, bottom and sides of said thickened portion, as shown in FIGURES 15 and 17 and as shown in plan view in FIGURE 13. A tension cup 47 is disposed within the rearwardly directed end of the tubular handle 42, a portion of said tension cup extending rearwardly beyond said handle and having a radially outwardly directed flange 47a. Inwardly of the tubular handle 42, the tension cup 47 is provided with a rectangular opening 47b adapted to receive the rearwardly directed end portion of a rectangular tension tube 48. As well shown in FIGURE 15, a pin 50 is disposed through suitable aligned openings in the tension tube 48 and small bores 47c in said tension cup whereby said tension tube is limited in its forward movement by the flange 47a.

The externally threaded portion 45 of the handle 42 carries an adjustment nut 49, and a sleeve 51 is slidably disposed over said handle between said adjustment nut and the flanges 47a of the tension cup 47. The sleeve 51 carries a plurality of rivets 52 having inwardly directed follower portions 52a adapted to engage the grooves 46 in the handle 42. As well shown in FIGURE 11, the sleeve 51 carries the grip portion 44, said grip portion having a grip 55 and integrally, converging arms 56 riveted or otherwise firmly secured to the sleeve 51. The grip and sleeve it will be noted may be rotated with respect to the handle to dispose the grip in various selected positions, as for example, in the plane of or at right angles to the plane of the blade.

The blade 43 of the second embodiment of the invention as illustrated is identical in every respect to the blade 3 of the first embodiment and will not be herein redescribed in detail. Said blade is provided with hinged brackets 20 between which the forwardly directed end of the tension tube 48 projects. The blade 43 is pivoted to said tension tube by means of a pin 53 for rotation from the full line position of FIGURE 14 to the dot-dash position shown therein, or to the completely folded position illustrated in FIGURE 12.

To secure the blade 43 in any of its operative positions, the adjustment nut 49 is turned upon the threaded portion 45 to move rearwardly against the forwardly directed end of the sleeve 51. The rearwardly directed end of said sleeve is thereby thrust rearwardly against the flange 47a of the tension cup 47 whereby the tension tube 48 is pulled rearwardly thereby bringing selected flat edge portions 20a, 20b, or 20c of the hinge brackets 20 in a rearward direction against a thrust cup 54 disposed at the forwardly directed end of the handle 42 being inserted within the forwardly directed end thereof, said cup having a radially extending flange 54a disposed over the end of the handle. The bottom of said cup has a rectangular opening 54b slidably receiving the tension tube 48 telescoped therein, and the selected edge surfaces 20a, 20b and 20c are adapted to abut against the flat front surface of said thrust cup or to be spaced therefrom for adjustment of the blade.

Figure 13:
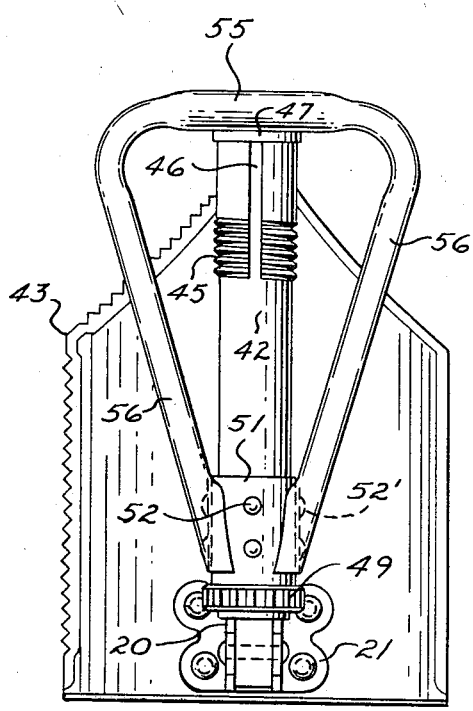
FIGURE 13 is a bottom plan view taken from the line 13—13 of FIGURE 12.

To adjust the intrenching tool 41 to a compact condition, the adjustment nut 49 is turned completely off of the externally threaded portion 45 in a forward direction to facilitate rapid adjustment thereof and the handle 42 can then be slidably telescoped rearwardly through the sleeve 51 to a position where a substantial portion of the handle is longitudinally and centrally disposed between the arms 56 of the grip portion 44 as best illustrated in FIGURE 13. It will be noted in FIGURE 14 that in the tightened or locked extended position of the tool, the flange 47a of the tension cup 47 is forced rearwardly a short distance away from the rearwardly directed end of the handle 42. Forward movement of the adjustment nut 49 in order to release the blade for movement thereof allows said tension cup and, therefore, the tension tube 48 to move forwardly a sufficient distance to allow rotation of the blade 43 by moving the hinge brackets 20 away from the thrust cup 54. Such forward movement is limited upon contact of the flange 47 with the rear end of the handle 42. The adjustment nut 49 need not be turned completely off of the threaded portion 45 to allow such adjustment of the blade but is only preferably so turned when it is desired to telescope and fold the intrenching tool 41 to the flat or compact condition illustrated in FIGURES 12 and 13.

Referring now to FIGURE 17, it will be noted that rivets 52′ having inner follower portions 52a′ may be used to both lock the sleeve 51 against rotation with respect to the handle 42, and, therefore, lock the grip portion 44 against rotation and also secure the forwardly directed ends of the arms 56 to said sleeve. The combined effect of all of the followers 52a and 52a′ is to hold the grip portion 44 firmly against rotation when the tool is in the locked position but at the same time to allow the handle portion 42 to slide rearwardly between the arms 56 when the tool is in its unlocked position.

As an intrenching tool, it will be observed that the tool of either modification is adapted for use as a shovel, as shown in FIGURES 11 and 14, or as a pick-mattock, as shown in FIGURE 4 and in dotted lines in FIGURE 14. It may further be used as a grass and weed cutter, a machete, a saw, a combat weapon, hip armour and further military use.

It will be understood that many changes in the details of the invention as herein described and illustrated may be made without, however, departing from the spirit thereof or the scope of the appended claims.

What I claim is:

1. A hand tool comprising in combination a work member, a hand grip member, a stress tension member having connections at either end of the same for said work and grip members, said work member being pivoted about one of said connections and said hand grip member being adjustable with respect to the other of said connections, an adjustable pressure means associated with said tension member securing said work member and said hand grip member in selected different positions with respect to said tension means and releasable to permit movement of said work and hand grip members with respect to their said connections for different operative positioning.

2. A hand tool as claimed in claim 1 wherein said tension connections are pivots and said hand grip member is pivotally secured to said tension member.

3. A hand tool as claimed in claim 1 wherein the adjustable pressure means comprises locking means adjacent each end of the stress tension member lockingly securing the work and hand grip members in selected operative position.

4. A hand tool as claimed in claim 1 wherein the adjustable pressure means comprises a hollow handle member telescopably mounted upon said stress tension member, said handle member and said tension member having relative movement, and a compression member adjustably movable upon said handle member to vary the effective length of said member.

5. A hand tool as claimed in claim 1 wherein the adjustable pressure means comprises a hollow handle member telescopably mounted upon said stress tension member, said handle member and said tension member being relatively movable, said handle member having an externally threaded portion, adjustment means mounted on said threaded portion and having a portion thereof which is projectable beyond the end of said handle member upon rotation of said adjustment means in one direction to vary the effective length of said handle member.

6. A hand tool as claimed in claim 1 wherein the adjustable pressure means comprises a hollow handle member telescopically mounted upon said stress tension member, said stress tension member being tubular and paced from said handle member by guide means, said handle member and said tension member being longitudinally relatively movable.

7. A hand tool as claimed in claim 1 comprising means whereby the said grip and handle members are held in end-to-end alignment during pivotal movement of the blade.

8. A hand tool as claimed in claim 3 comprising means whereby the said grip and handle members are held in end-to-end alignment during pivotal movement of the blade and during locked engagement of the blade in any one of selected operative positions by the pressure means.

9. A hand tool as claimed in claim 1 comprising means whereby the said grip and handle members are held in end-to-end alignment during pivotal movement of the blade, said last named means being adapted to manually pivot the grip member.

10. An intrenching tool comprising in combination, a spade-like blade member, a hand grip member, a hollow handle, a stress tension member telescoped within said hollow handle and protruding therethrough at either end, said stress tension member connected to said blade and said hand grip member, thrust means disposed adjacent each end of said tension member, said blade and hand grip member adapted to move into contact with one of said thrust members, adjustable pressure means adapted to be telescopically over and movable with respect to said hollow handle whereby said thrust means may optionally secure the blade and hand grip member in selected adjusted position.

11. An intrenching tool as claimed in claim 5 wherein said stress tension member has pivots at opposite ends therefor for pivotal connection to said blade and grip members.

12. An intrenching tool as claimed in claim 5 wherein the said adjustable pressure means provides thrust means for contacting the blade and grip member.

13. An intrenching tool as claimed in claim 5 wherein one of said thrust members is integrally secured to said adjustable pressure means and movable therewith into contact with said blade member.

14. An intrenching tool as claimed in claim 5 wherein one of said thrust members is integrally secured to said adjustable pressure means and movable therewith into contact with said blade member, said blade member having bracket means extending outwardly of the blade, and pivot means projecting through said bracket and said stress tension member, said thrust means lockingly engaged with a portion of said bracket during an operative position of the blade and disengaged during a further operative position.

15. An intrenching tool as claimed in claim 10 wherein said pressure means is adjustably movable upon said handle to vary the effective length thereof and to exert pressure upon one of said thrust means to bring the same into contact with the said blade member and said grip member.

16. An intrenching tool comprising a hollow handle, a stress tension member having a substantial portion thereof slidably disposed within said handle, a hand grip portion pivoted to one end of said tension member and a blade pivoted to the other end thereof, said handle including an adjustment means thread fitted and rotatable thereon to vary the effective length of said handle, said grip portion and said blade having means providing differently angled surface portions, disposed adjacent to the ends of said handle whereby said handle can be elongated to bring the ends thereof into contact with selected of said surface portions thereby locking said grip portions and said blade in differently angled positions relative to said handle.

17. An intrenching tool as set forth in claim 16, wherein the tension member comprises a generally rectangular hollow tube, a non-rotatable thrust member disposed between an end of the hollow handle and the grip portion, said surface portions of said grip portion bearing against said thrust member during pivotal movement thereof.

18. An intrenching tool as set forth in claim 16 wherein said adjustment means having a thrust portion adapted to be brought into locked engagement with said surface portions of said blade.

19. An intrenching tool as set forth in claim 16, and means telescoped within said hollow handle and over said tension tube and having a limited range of movement with respect thereto and exerting pressure urging said tension tube in the direction of said blade.

20. An intrenching tool as set forth in claim 10 wherein said spade-like blade member is provided on one lateral side thereof with sharpened edges and with the opposite lateral edges being serrated.

21. An intrenching tool as set forth in claim 20 wherein said blade is arcuate in cross-section and a portion of said serrations is disposed along a curved, forward edge of said blade.

22. An intrenching tool comprising a hollow handle, a stress tension member having a substantial portion thereof slidably disposed within said handle, a hand grip portion slidably mounted upon said handle, a spade-like blade pivotally mounted at one end of said tension member, said tension member having means associated therewith at its opposite end adapted to be movable therewith to limit movement of said tension member in the forward direction of the blade and to limit rearward movement of the hand grip portion in an opposite rearward direction, means carried by said handle and co-operating means carried by said hand grip portion to secure the hand grip portion in rotative fixed position with respect to said handle, adjustment means associated with said handle and adapted to lock said hand grip portion and said blade in different operative positions.

23. An intrenching tool as set forth in claim 22 wherein said means associated with the opposite end of said tension member is secured thereto and has a radially outwardly extending flange adapted to abut an end of said adjustment pressure means.

24. An intrenching tool as set forth in claim 22 wherein said adjustment means includes a sleeve secured to said grip portion and slidable with respect to said handle, and said adjustment means further includes an internally threaded portion adapted to engage externally threaded portions of said handle and to abut said sleeve for positioning said grip portion in an adjustment position.

25. An intrenching tool as set forth in claim 22 wherein said means carried by said handle comprise circumferentially spaced, longitudinally extending grooves and said co-operating means comprise follower means adapted to engage said grooves and retain said grip portion in a selected rotated position about the axis of said handle.

References Cited
UNITED STATES PATENTS

| | | | |
|---|---|---|---|
| 1,032,754 | 7/1912 | Heidkamp | 7—14.55 |
| 1,032,376 | 7/1912 | Boivin | 294—52 X |
| 2,830,307 | 4/1958 | Worden | 294—51 X |
| 2,833,585 | 5/1958 | Nischan | 294—51 |

ANDRES H. NIELSEN, *Primary Examiner.*